Jan. 9, 1940. V. C. POSEY 2,186,041
LIQUID SEPARATING DEVICE FOR CONTAINERS
Filed Sept. 26, 1938
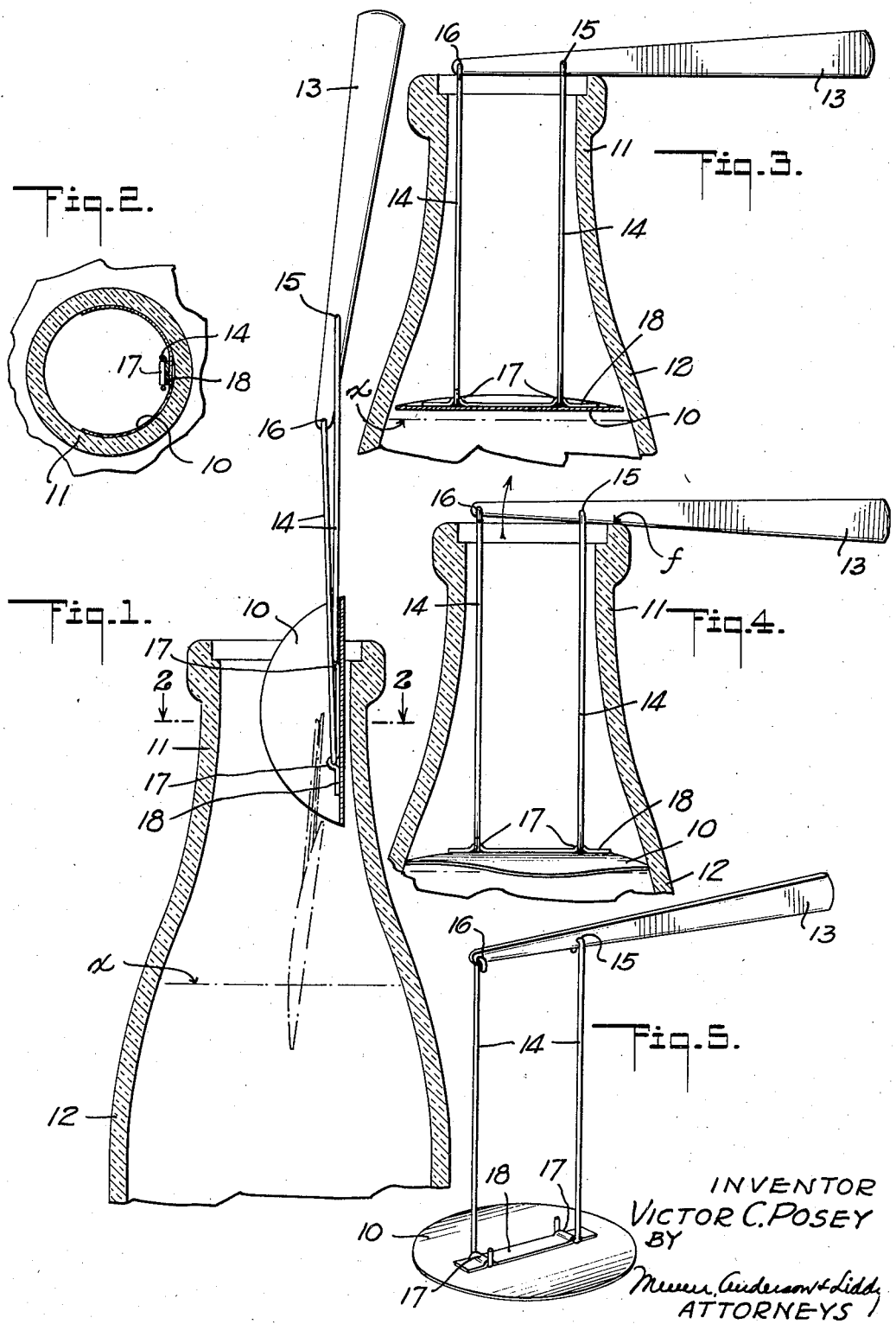
INVENTOR
VICTOR C. POSEY
BY
Miller, Anderson & Liddy
ATTORNEYS Patented Jan. 9, 1940

2,186,041

UNITED STATES PATENT OFFICE 2,186,041

LIQUID SEPARATING DEVICE FOR CONTAINERS

Victor C. Posey, Santa Barbara, Calif.

Application September 26, 1938, Serial No. 231,715

3 Claims. (Cl. 210—51.5)

This invention relates generally to containers, and more particularly to devices by which liquid of one specific gravity can be separated from liquid of a different specific gravity in a container, and then removed from the container, such as, for example, the separation and removal of cream from milk.

An object of the invention is to provide a separator which is structurally characterized in a novel and ingenious manner enabling it to be utilized with a standard form of container, such as an ordinary milk bottle, for example, to separate cream at the top of the bottle from the remainder of its contents, and permit the separated cream to be conveniently poured from the bottle.

Another object of the invention is to provide a separator of the above described character embodying a closure member which is insertable into the neck of the milk bottle in a deformed condition and in a position causing but negligible disturbance of the body of cream at the top of the bottle, and is readily manipulated within the bottle to occupy a partition-forming position at a predetermined location of larger internal area of the bottle than at the smallest part of the neck, so as to enable that portion of the bottle's contents between the member and mouth of the bottle to be readily poured therefrom.

A further object of the invention is to provide a separating device which is of simple and inexpensive construction and which can be easily sterilized.

With these and other objects in view, the invention resides in the combinations and arrangements of elements as set forth in the following specification, and particularly pointed out in the appended claims.

In the accompanying drawing.

Figure 1 is a view of the invention in side elevation and illustrating the initial position thereof in inserting the separator or closure member into a container such as an ordinary milk bottle, of which the neck and a portion of the body is illustrated;

Figure 2 is a transverse sectional view taken on the line 2—2 of Figure 1;

Figure 3 is a view similar to Figure 1 and illustrating the second position of the separator preparatory to sealing off the upper portion of the container from the remainder thereof;

Figure 4 is a view also similar to Figure 1 and illustrating the final position of the separator in separating the cream from the milk for pouring from the bottle;

Figure 5 is a perspective view of the invention.

Referring specifically to the drawing, the invention comprises a separator or closure member 10 which is preferably in the form of a disk body of stainless spring steel of such gage as to enable it to be readily deformed laterally by being manually flexed to a bowed position for insertion through the neck 11 of a milk bottle 12, the diameter of the member being in excess of the internal diameter of the neck at the mouth of the bottle and being such as to tightly span the bottle transversely at a location of larger internal diameter thereof, such as at approximately the cream level $x$ in the bottle.

The member 10 is adapted to be manipulated by means of a lever handle 13 operatively connected to the member by means of a pair of links 14 pivotally connected at one end at 15 and 16 to the lever, with the spacing of the pivots being less than the internal diameter of the smallest part of the neck 11, which in the case of an ordinary milk bottle is at the mouth thereof.

At their other end, the links are privotally connected in similarly spaced relationship to the member 10 at diametrically opposite sides of the center thereof, by means of sleeves 17 formed on metal straps 18 welded or otherwise secured to the member. It has been found in practice that piano wire provides an excellent material for the links 15 and 16, as it is readily worked at the ends of the links to form pivotal connections and has the ends of the links to form the pivotal cannections and has the requisite strength for their intended functioning in the operation of the invention, which is as follows:

The closure member 10 is first bowed from its normal substantially flat condition shown in Figure 5, until it can be started through the mouth of the bottle, by pushing upon the handle 13 in the direction of its length, it being noted that due to the parallelogrammic arrangement and connection of the links 14 to the member 10 and to the handle 13, rocking motion of the handle about the pivotal connections of the links thereto will effect similar rocking motion of the closure member.

In the position of the closure member shown in Figure 1, the handle and links are in substantially alined relationship, and the member is inserted edgewise through the bottle neck, so as to cause but negligible, if any, disturbance of the contents of the bottle.

When the closure member is thus inserted, the handle is swung to a position wherein it rests upon the lip of the bottle mouth to provide a fulcrum point *f*, (Figure 4), it being clear that upon this lever movement of the handle a corresponding movement is imparted to the member 10 through the links 14 so that the member is now disposed transversely in the bottle and is loose therein as shown in Figure 3.

Now, upon swinging the handle downwardly about the fulcrum *f* so as to cause an upward pull upon the links 14, the closure member 10 will be drawn into tight and substantially sealing contact of its peripheral edge with the internal surface of the bottle, it being understood that the closure member readily flexes laterally around its periphery sufficiently to compensate for slight inaccuracies in the bottle wall from a true circular form, so as to provide the necessary seal.

The handle is maintained in this position so as to hold the member in its partition-forming position as the bottle is tilted to pour off that portion of the bottle's contents between the member and the mouth of the bottle.

After restoring the bottle to an upright position, the handle 13 is reversely swung to dispose the closure member in the position shown in broken lines in Figure 1, following which a pull is exerted upon the handle to draw the member from the bottle, it being clear that the member is deformed to its bowed position by its camming engagement with the internal wall of the bottle neck as the withdrawing operation proceeds until the member is finally clear of the bottle and is free to spring back to its normal position. As the entire device is of indestructible material, it can be readily sterilized, which is absolutely essential in the case of physiological liquids, such as milk.

What is claimed is:

1. A separator of the class described comprising a flexible disk body insertable in a flexed condition edgewise through the neck of a container; a handle; and links pivotally connected at their ends to the handle and to said body respectively for insertion of the latter into the container as aforestated, the lengths of the links being such that manipulation of the body within the container by a fulcruming movement of the handle on the container at one side of the links, can be effected, to draw the body into a partition forming position at a location spaced from the outlet of the neck.

2. A separator of the class described comprising a flexible disk body insertable in a flexed condition edgewise through the neck of a container; a handle; and a pair of links of substantially equal lengths pivotally connected at spaced points to the handle and to the body in a substantially parallelogrammic arrangement for co-action in enabling the body to be inserted into the container as aforestated, the lengths of the links being such that the handle can be manipulated by a fulcruming movement thereof upon the mouth of the container, to a partition forming position wherein the body contacts the internal wall of the container at a location spaced from the outlet of the neck.

3. A separator of the class described comprising a flexible disk body; a handle; and links pivotally connected at spaced points to the handle, and pivotally connected to the disk at opposite sides of the center thereof.

VICTOR C. POSEY.